W. C. BLUNDON & V. H. ESCH.
SUBSTITUTE LIGHT FOR AUTOMOBILE LANTERNS.
APPLICATION FILED OCT. 29, 1910.

988,434.

Patented Apr. 4, 1911.

UNITED STATES PATENT OFFICE.

WILLIAM C. BLUNDON AND VICTOR H. ESCH, OF WASHINGTON, DISTRICT OF COLUMBIA.

SUBSTITUTE LIGHT FOR AUTOMOBILE-LANTERNS.

988,434.  Specification of Letters Patent.  Patented Apr. 4, 1911.

Application filed October 29, 1910.  Serial No. 589,830.

*To all whom it may concern:*

Be it known that we, WILLIAM C. BLUNDON and VICTOR H. ESCH, residing at Washington, District of Columbia, have invented a new and useful Substitute Light for Automobile-Lanterns, of which the following is a specification.

Our invention relates to substitute light for automobile lanterns, being in the form of a candle lamp, and the object of our invention is to provide a simple and inexpensive article of manufacture for this purpose.

A further object of our invention is to provide an article which may be quickly adjusted and held firmly in place and which supplies an efficient light within the automobile lantern when the supply of illuminating gas fails, as quite frequently happens.

With these objects in view, our invention is set forth in the specification and claims and illustrated in the accompanying drawings, in which—

Figure 1:
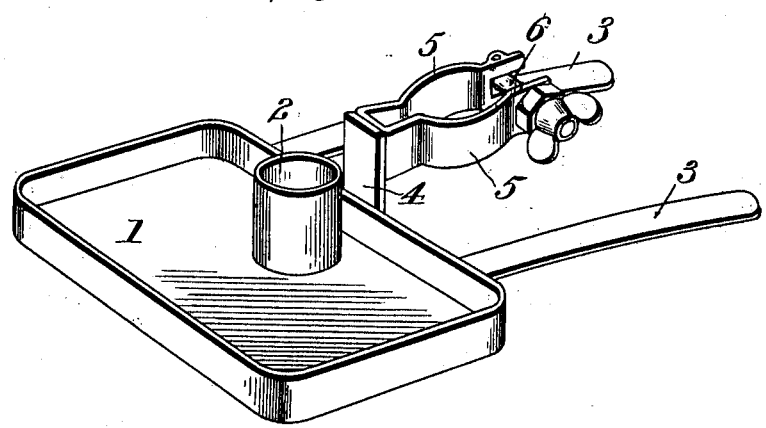
Figure 2:
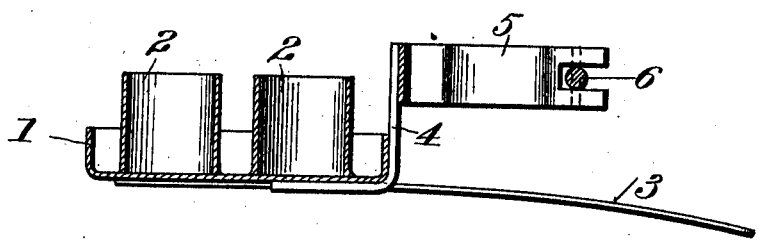

Figure 1 is a plan view of our device, and Fig. 2 is a sectional view thereof, illustrating an additional candle socket placed upon the drip pan.

Referring to the drawings, 1 is a drip pan into which is fixed the candle socket 2; attached to the bottom of the said drip pan are the spring fingers 3—3 and between these spring fingers the angular support 4 is fixed to the drip pan. From the vertical face of the angular support 4 the spring jaws 5—5 project rearwardly and are provided with a clamp and screw 6.

The operation of the device follows: When, on account of the lack of gas supply for the automobile lantern, it is necessary to have other means of illumination for the search light, the device above referred to may be placed in the lantern by simply slipping the spring jaws over the gas jet and giving a downward pressure while clamping them tightly to said jet. This will press the spring fingers against the floor of the lantern and the upward pressure exerted thereby will, in connection with the now immovable spring jaws, hold the device firmly in place and prevent all displacement by jarring while going over rough roads or the like.

While we have described and illustrated our invention as a lamp having a candle socket therein, it is obvious that any number of candle sockets might be placed upon the drip pan and also that the drip pan might be of any shape other than the one shown, without departing from the spirit of our invention.

Having thus described our invention, what we claim as new and desire to obtain by Letters Patent of the United States is:

1. In a substitute light for automobile lanterns, a removable light bracket, clamping means adapted to engage a gas jet in an automobile lantern and spring fingers attached to said light bracket and adapted to touch the floor of an automobile lantern at points, thereby exerting upward pressure which, acting against the immovable clamping means, holds the light bracket steady, substantially as described.

2. In a substitute light for automobile lanterns, a removable light bracket composed of a drip pan having a candle socket therein, curved resilient fingers attached to the bottom of said drip pan, an angular support fixed to said drip pan, spring jaws provided with locking means, extending from the vertical face of said angular support and adapted to immovably engage a gas jet of an automobile lantern and to coact with said spring fingers to hold the removable light bracket in place firmly, substantially as described.

3. In a substitute light for automobile lanterns, a removable candle-light bracket composed of a drip pan having a candle socket therein, spring fingers attached to said drip pan and adapted to press against the floor of an automobile lantern, an angular support attached to said drip pan, spring jaws extending rearwardly from said angular support and adapted to be clamped tightly around a gas jet of an automobile lantern and thus, along with the pressure of said spring fingers, hold the said light bracket immovable against all jar, substantially as described.

In testimony whereof we affix our respective signatures, in presence of two witnesses.

WILLIAM C. BLUNDON.
VICTOR H. ESCH.

Witnesses:
NEWTON P. WILLIS,
C. W. FOWLER.

Copies of this patent may be obtained for five cents each, by addressing the "Commissioner of Patents, Washington, D. C."